United States Patent [19]

McCarthy

[11] Patent Number: 5,243,646
[45] Date of Patent: Sep. 7, 1993

[54] FAST REDIAL SYSTEM FOR A TELEPHONE

[75] Inventor: Dennis R. McCarthy, Syracuse, N.Y.

[73] Assignee: Thomson Consumer Electronics, Inc., Indianapolis, Ind.

[21] Appl. No.: 637,017

[22] Filed: Jan. 4, 1991

[51] Int. Cl.5 .......................................... H04M 1/272
[52] U.S. Cl. ..................................... 379/356; 379/58; 379/355; 379/359
[58] Field of Search ............... 379/355, 356, 359, 362, 379/361, 58

[56] References Cited

U.S. PATENT DOCUMENTS

| | | | |
|---|---|---|---|
| 3,792,203 | 2/1974 | Martin | 379/355 |
| 4,508,939 | 4/1985 | Lawson et al. | 379/355 |
| 4,581,488 | 4/1986 | Lawson et al. | 379/359 |
| 4,602,128 | 7/1986 | Freundlich | 379/355 X |
| 4,741,029 | 4/1988 | Hase et al. | 379/359 |
| 4,887,294 | 12/1989 | Ruey-Guang | 379/355 |
| 4,930,155 | 5/1990 | Kurokawa | 379/354 |

Primary Examiner—James L. Dwyer
Assistant Examiner—M. Shehata
Attorney, Agent, or Firm—Joseph S. Tripoli; Peter M. Emanuel; Frederick A. Wein

[57] ABSTRACT

The present invention is directed to a telephone unit having a redial capability wherein if the number called is busy and a redialing is desirable, a determination is made as to whether a dialing operation has taken place since the telephone was placed in an "off" hook status. If no dialing operation has taken place, then the telephone will dial the desired redial number which is the last dialed telephone number. If the determination is that a dialing operation has taken place since the phone was placed in an "off" hook status, then an operation is initiated upon initiating the redial order command where the telephone is electronically placed in an "on" hook status in order to release the telephone line of the telephone network, and then is reestablished in an "off" hook status for capturing a line of the telephone network. Upon capturing a line of the telephone network, the redial system redials the desired telephone number.

4 Claims, 3 Drawing Sheets

FAST REDIAL SYSTEM FOR A TELEPHONE

BACKGROUND

The present invention relates to providing a fast redial system of the last number stored in a telephone dial buffer of a telephone unit, and is particularly applicable to cordless telephones having a portable handset and a base unit.

Presently, telephones, and particularly cordless telephones, having a redial capability requiring the user to manually go "on" hook and then "off" hook in order to use the redial function if the number dialed was busy and the call was not completed. This has proved to be very bothersome and inconvenient particularly for some cordless phones where going "on" hook and "off" hook are not simple procedures.

The present invention eliminates such undesirable operational conditions so that the telephone provides an "on" hook and "off" hook control when the redial key of the handset is enabled.

SUMMARY OF THE INVENTION

The present invention is directed to a telephone unit having a redial capability wherein if the number called is busy and a redialing is desirable, a determination is made as to whether a dialing operation has taken place since the telephone was last in an "off" hook status. If no dialing operation has taken place, then the telephone will dial the desired redial number which is the last dialed telephone number. If the determination is that a dialing operation has taken place since the phose was last in an "off" hook status, then an operation is initiated upon initiating the redial order command where the telephone is electronically placed in an "on" hook status in order to release the telephone line of the telephone network, and then is reestablished in an "off" hook status for capturing a line of the telephone network. Upon capturing a line of the telephone network, the redial system redials the desired telephone number. Thus, upon initiating a redial operation, the telephone will redial without at any time requiring a manual hangup and a subsequent "off" hook being accomplished by the user.

DETAILED DESCRIPTION OF THE PREFERRED EMBODIMENT

Figure 1:
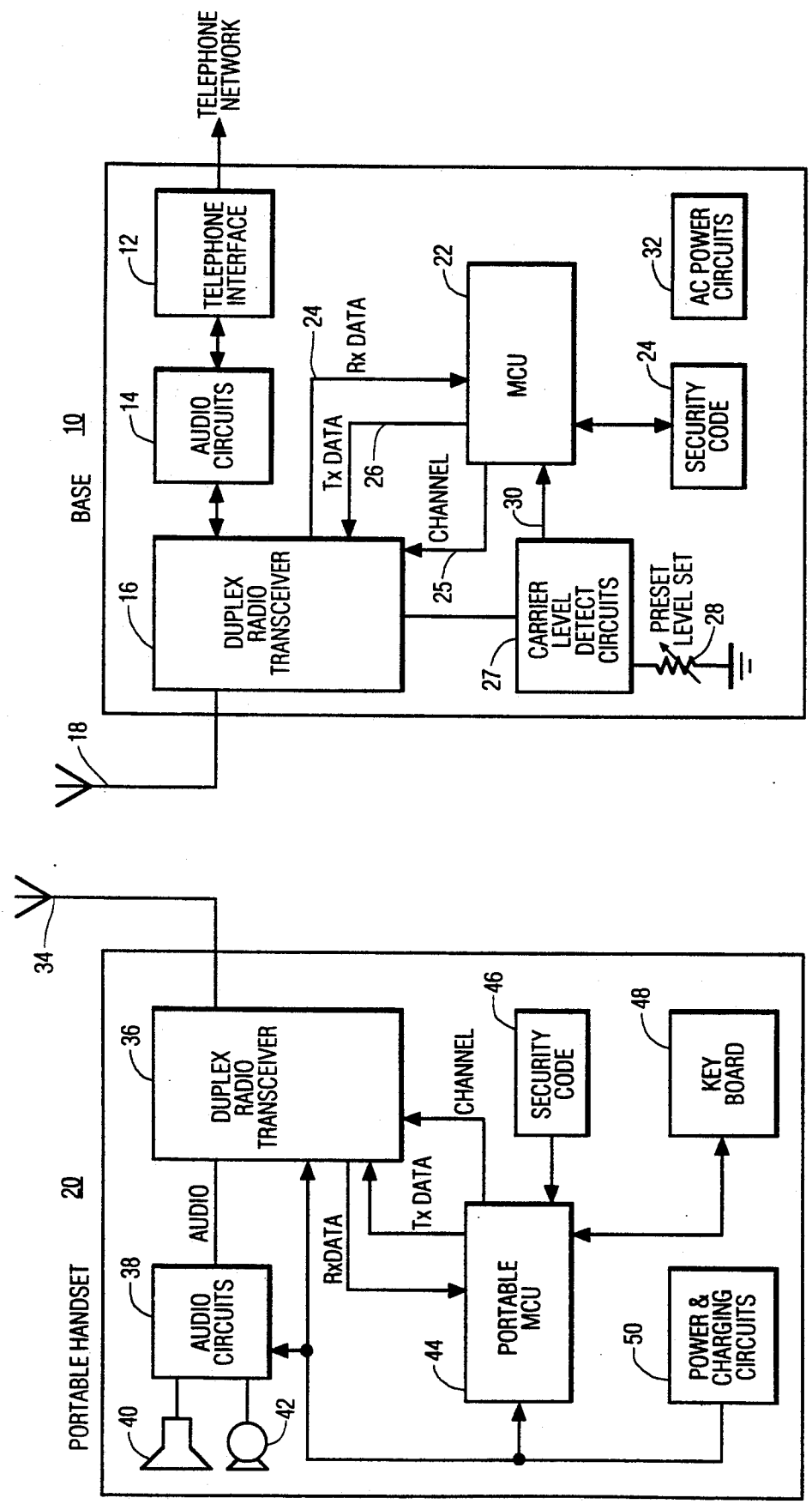
FIG. 1 is a block diagram representation of a cordless telephone of the exemplary embodiment.

Reference can be had to the drawings whereas like members are designated with the like numerals. FIG. 1 shows a cordless telephone arrangement. A cordless telephone includes a base until 10 having a telephone interface 12 which interconnects with an externally provided telephone network. Telephone interface 12 provides a two-way (full duplex) coupling between the telephone network and audio circuits 14, which in turn provides two-way communication with full duplex radio transceiver 16 coupled to an antenna 18. Transceiver 16 transmits and receives duplex transmissions with handset 20 on a pair of channels within the frequency range of 46 MHz through 49 MHz with the carrier being FM modulated according to applicable FCC specifications. The operation of transceiver 16 is governed by microprocessor 22 through data receive line(s) 24, data transmit line(s) 26, and channel selection line 25. It is not uncommon for microprocessor 22 to be provided with a security code generator 24 so that it is determined that the received transmissions are received from the designated portable handset and not from a handset of another telephone unit. A determination is made by detection circuit 26 whether or not the carrier signal received by transceiver 16 from handset 20 is above a predetermined threshold level. The determination of the detected carrier level is coupled to microprocessor 22 at line 30. Base 10 is also provided with DC power voltages from power supply 32 which is coupled to a source of power such as a DC battery or an AC line.

Handset 20 is provided with an antenna 34 coupled to a duplex radio transceiver 36 which in turn is coupled to audio circuits 38 for providing the received signal in audio form to loudspeaker 40 and receiving input voice communications from microphone 42 for transmission to base 10. Transceiver 36 is controlled by a microprocessor 44 having a security code input from 46 and a keyboard entry port from keyboard 48 to enable dialing out as well as transmitting other commands such as redial or "on" hook/"off" hook signals to microprocessor 22. Handset 20 is also provided with a power supply 50 such as a battery, and can also include channel selection circuits for selecting which channels are to be used in communication with base 10.

The operation of a cordless telephone typically requires that a digital security code be sent from the portable handset to the base unit in order for the base unit to go "off hook" and seize and connect to a telephone line of the telephone network.

The present invention eliminates the undesirable operational condition of the prior art devices where the telephone, and particularly a cordless telephone handset, must be placed "on" hook and then "off" hook when the redial of the handset is enabled after a dialing operation has taken place. According to aspects of the present invention and with reference to FIG. 1 and table 1 below, the microcontroller of the handset is programmed so that a "key dialed flag" is cleared when the handset is taken "off hook". If the telephone is dialed, then the "key dialed flag" is set to indicated that a dialing operation has taken place since the phone went "off" hook. If the "redial key" is entered, microprocessor 22 will check to see if the "key dialed flag" is set or cleared. If the key dialed flag is clear, the microcontroller will dial the number last stored in its redialed memory. If the key dialed flag is set, then the microcontroller dialing routine will insert an "on" hook and an "off" hook operation otherwise known as a "long flash" command before dialing from the redial memory. The "on/off" hook or "long flash" command of about 1.2 seconds is long enough to ensure that the telephone hook switch in the telephone central office will open. This will cause the central office to release the phone line and provide a new connection to the cordless phone that will allow completion of the redial.

TABLE 1

1. DIAL BUFFER EXAMPLE WHEN PHONE IS "ON" HOOK.

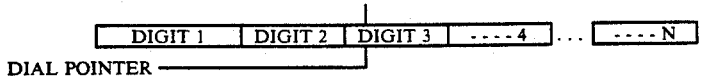

DIAL POINTER

"KEY DIALED FLAG" = DON'T CARE

2. DIAL BUFFER WHEN PHONE IS TAKE "OFF" HOOK.

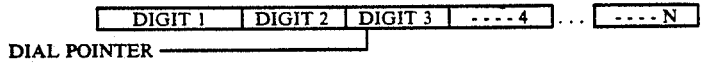

DIAL POINTER

"KEY DIALED FLAG" = CLEAR

3. DIAL BUFFER WHEN REDIAL IS ENTERED AND "KEY DIALED FLAG" IS CLEAR.

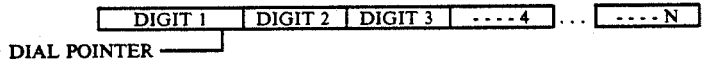

DIAL POINTER

"KEY DIALED FLAG" = CLEAR

4. DIAL BUFFER WHEN REDIAL IS ENTERED AND "KEY DIALED FLAG" IS SET.

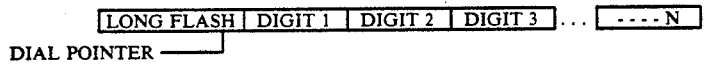

DIAL POINTER

"KEY DIALED FLAG" = SET

Figure 2:
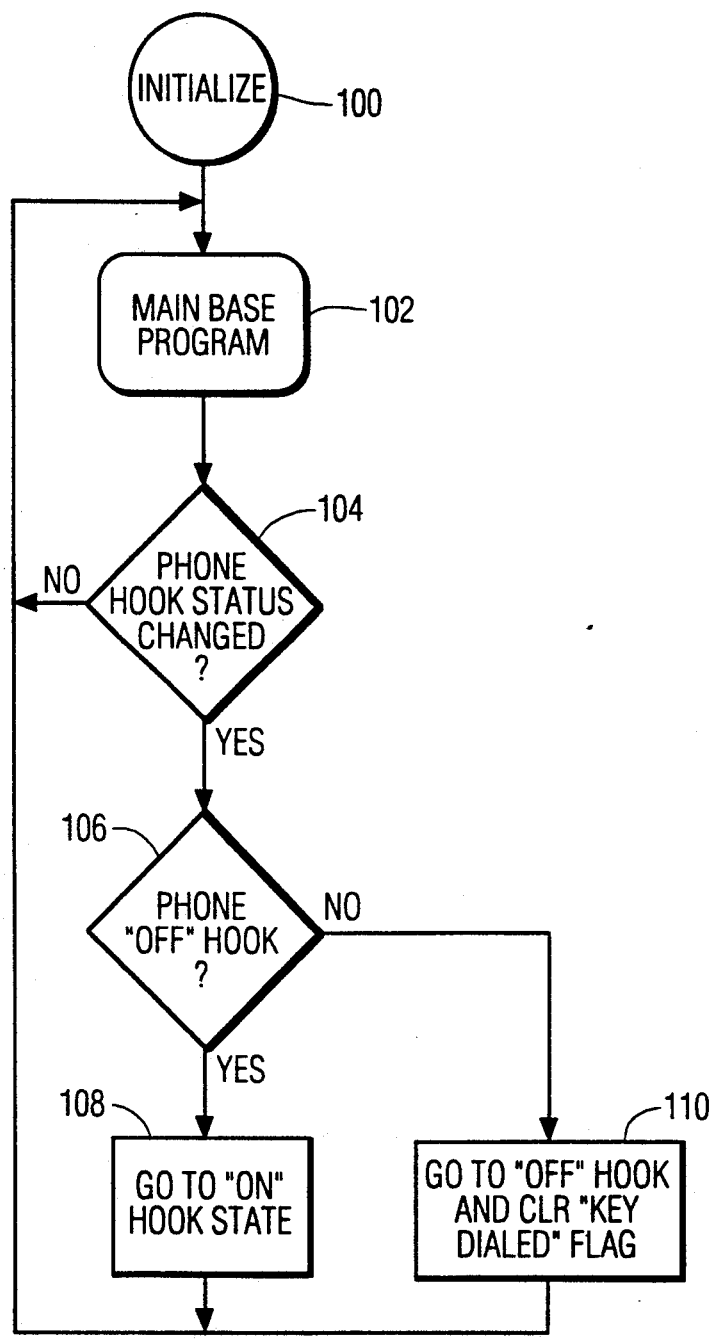
FIG. 2 is a flowchart of the main base program of the redial system according to aspects of the present invention.

Referring now to FIG. 2 there is shown a flowchart for the telephone operation discussed above. At 100 system is initialized and at 102 the main base routine is entered. At 104 a decision is made as to whether the phone hook status has been changed since the last dial operation. If the answer is yes, then a determination at 106 is made as to whether the phone is "off" hook. If the answer is yes, then at 108 the telephone system will go "on" hook, in which case the operation will then start again and when block 106 is reached the answer this time will be no. The system will then go "off" hook as shown in block 110 and clear the key dialed flag thus initiating the redial from the telephone stored memory.

Figure 3:
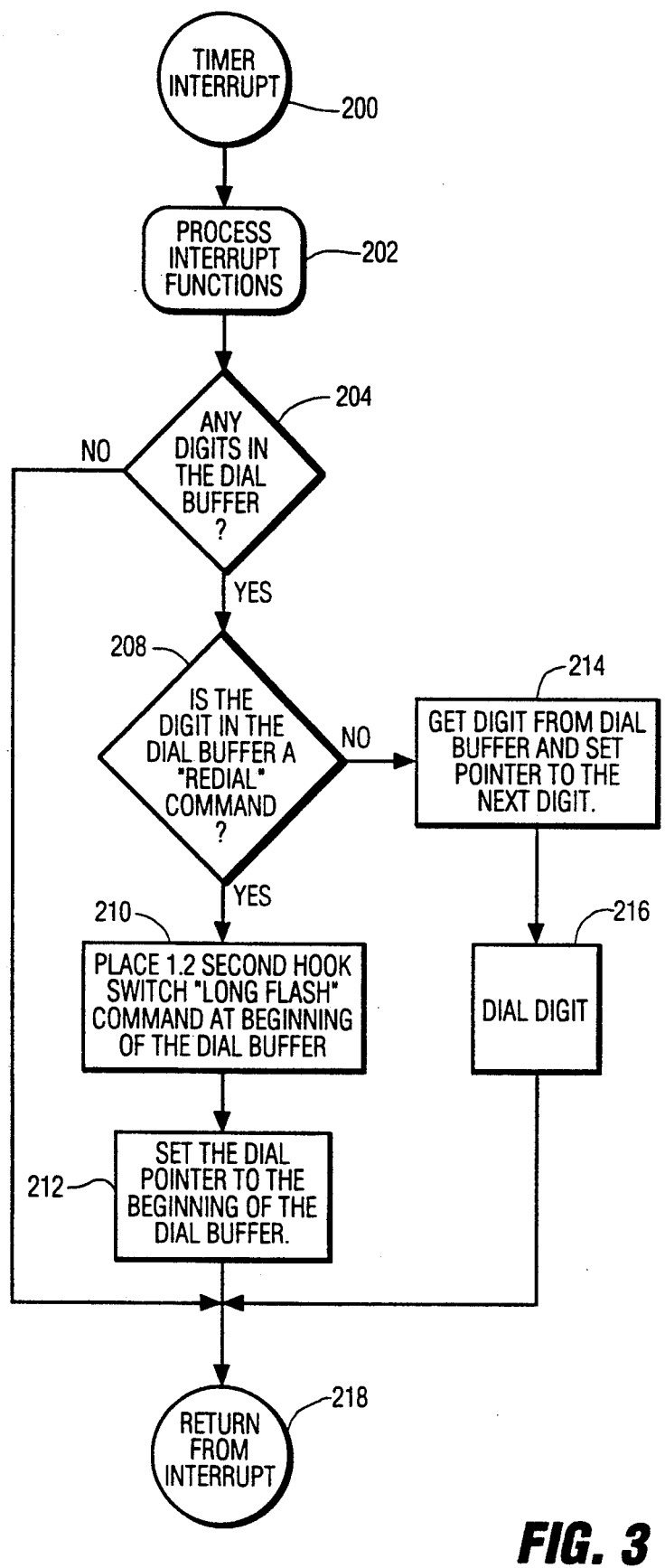
FIG. 3 is a flowchart of a interrupt routine used by the main base program of FIG. 2.

Referring now to FIG. 3 there is shown a detail flow chart of the interrupt service routine used in cooperation with the main base program of FIG. 2. A timer interrupt is instituted at 200 which institutes the process interrupt functions of 202. If there are any digits in the dial buffer as tested according to 204 then the determination is made at 208 whether the digit in the dial buffer is a redial command. If the answer is yes, then at 210 operation is instituted to initiate a 1.2 second hook switch "long flash" command at the beginning of the dial buffer and to set the pointer to the beginning of the dial buffer according to 212. If according to the decision at 208 the digit in the dial buffer is not a redial, and then at 214 the operation of getting a digit from the dial buffer is initiated and the pointer is set to read the next digit. The read digit is dialed at 216. The return from the interrupt is accomplished at 218.

Thus, it is shown how the operation of an "on" hook and "off" hook operation can be instituted when a redial command is instituted without causing the user to manually go "on" hook and "off" hook in order to institute a redial.

What is claimed is:

1. A telephone unit connectable to a telephone network, said telephone unit having one of an "on hook" and "off hook" status with respect to the telephone network and having manually actuatable redial means comprising:
   actuatable dialing means,
   data entry means for entering a telephone number be dialed by the actuatable dialing means,
   memory means for storing the entered telephone number,
   redial means for initiating the dialing of the telephone number stored in the memory means, said redial means comprising means for determining whether a dialing operation has taken place since the telephone has been placed in an "off hook" status, and a first means for originating a redial signal corresponding to the stored telephone number if the determination is "no", and a second means for placing the telephone unit sequentially in an "on hook" and an "off hook" status, and initiating a redial signal corresponding to the stored telephone number if the determination is "yes".

2. The telephone unit of claim 1 wherein the data entry means includes a plurality of manual selection buttons.

3. The telephone unit of claim 1 wherein the telephone unit includes a portable handset and a base station of a cordless telephone unit.

4. A method of redialing for a telephone unit having a redial means and connectable to a telephone network, comprising the steps of:
   storing an entered telephone number in a memory means,
   determining whether a dialing operation has taken place since the telephone has been placed in an "off hook" status,
   originating a redial signal corresponding to the stored telephone number if the determination is "no", and
   sequentially originating an "on hook" signal and an "off hook" signal, and a redial signal corresponding to the stored telephone number if the determination is "yes".

* * * * *